US008844370B1

(12) United States Patent
Karon et al.

(10) Patent No.: US 8,844,370 B1
(45) Date of Patent: Sep. 30, 2014

(54) ELECTROMAGNETIC FLOW METER HAVING A DRIVER CIRCUIT INCLUDING A CURRENT TRANSDUCER

(71) Applicant: Concepts ETI, Inc., White River Junction, VT (US)

(72) Inventors: David M. Karon, South Royalton, VT (US); Vincent Cushing, Annapolis, MD (US); Sandeep K. Patel, Madison, AL (US)

(73) Assignee: Concepts ETI, Inc., White River Junction, VT (US)

( * ) Notice: Subject to any disclaimer, the term of this patent is extended or adjusted under 35 U.S.C. 154(b) by 0 days.

(21) Appl. No.: 14/212,967

(22) Filed: Mar. 14, 2014

Related U.S. Application Data

(60) Provisional application No. 61/787,559, filed on Mar. 15, 2013.

(51) Int. Cl.
*G01F 1/58* (2006.01)
(52) U.S. Cl.
CPC ........................................ *G01F 1/58* (2013.01)
USPC ....................................................... 73/861.12
(58) Field of Classification Search
None
See application file for complete search history.

(56) References Cited

U.S. PATENT DOCUMENTS

| 5,469,746 | A | 11/1995 | Fukunaga et al. | |
|---|---|---|---|---|
| 6,532,829 | B1 * | 3/2003 | Franklin | 73/861.66 |
| 7,310,582 | B2 | 12/2007 | Ishikawa | |

OTHER PUBLICATIONS

"Electromagnetic Flow Metering," by Jens Krause. Recent Advances in Modelling and Simuation, Chapter 10, pp. 165-186, FuE Zentrum FH Kiel GmbH, Kiel, Germany, Jun. 2008.
"Scale Effects In The Dynamic Transfer Functions For Cavitating Inducers," by C.E. Brennen et al. The American Society of Mechanical Engineers, Winter Annual Meeting, Nov. 16-21, 1980.
"An Application of the Electromagnetic Flowmeter For Analyzing Dynamic Flow Oscillations," by Houston M. Hammac. NASA Technical Memorandum X-53570, Propulsion and Vehicle Engineering Laboratory, Jan. 23, 1967, pp.
"ElectrornagneticFlowmeter," by Vincent Cushing. Engineering-Physics Company. The Review of Scientific Instruments, vol. 36, No. 8, pp. 1142-1148, Aug. 1965.
"An Alternating Field Induction Flow Meter of High Sensitivity," by Alexander Kolin. The Review of Scientific Instruments, vol. 16, No. 5, pp. 109-116, May 1945.
"Electromagnetic Flowmeter for Insulating Liquids," by Vincent Cushing. IEEE Instrumentation and Measurement Technology Conference, Anchorage, AK, USA, May 21-23, 2002.
"A Practical Pulsation Threshold For Flowmeters," by V.P. Head. Trans. ASME, vol. 78, No. 7, pp. 1471-1479, Oct. 1956.

* cited by examiner

*Primary Examiner* — Harshad R Patel
(74) *Attorney, Agent, or Firm* — Downs Rachlin Martin PLLC

(57) ABSTRACT

An electromagnetic flow meter (EMFM) accurately measures both the complete flow rate and the dynamically fluctuating flow rate of a fluid by applying a unipolar DC voltage to excitation coils for a predetermined period of time, measuring the electric potential at a pair of electrodes, determining a complete flow rate and independently measuring the dynamic flow rate during the "on" cycle of the DC excitation, and correcting the measurements for errors resulting from galvanic drift and other effects on the electric potential. The EMFM can also correct for effects from the excitation circuit induced during operation of the EMFM.

20 Claims, 10 Drawing Sheets

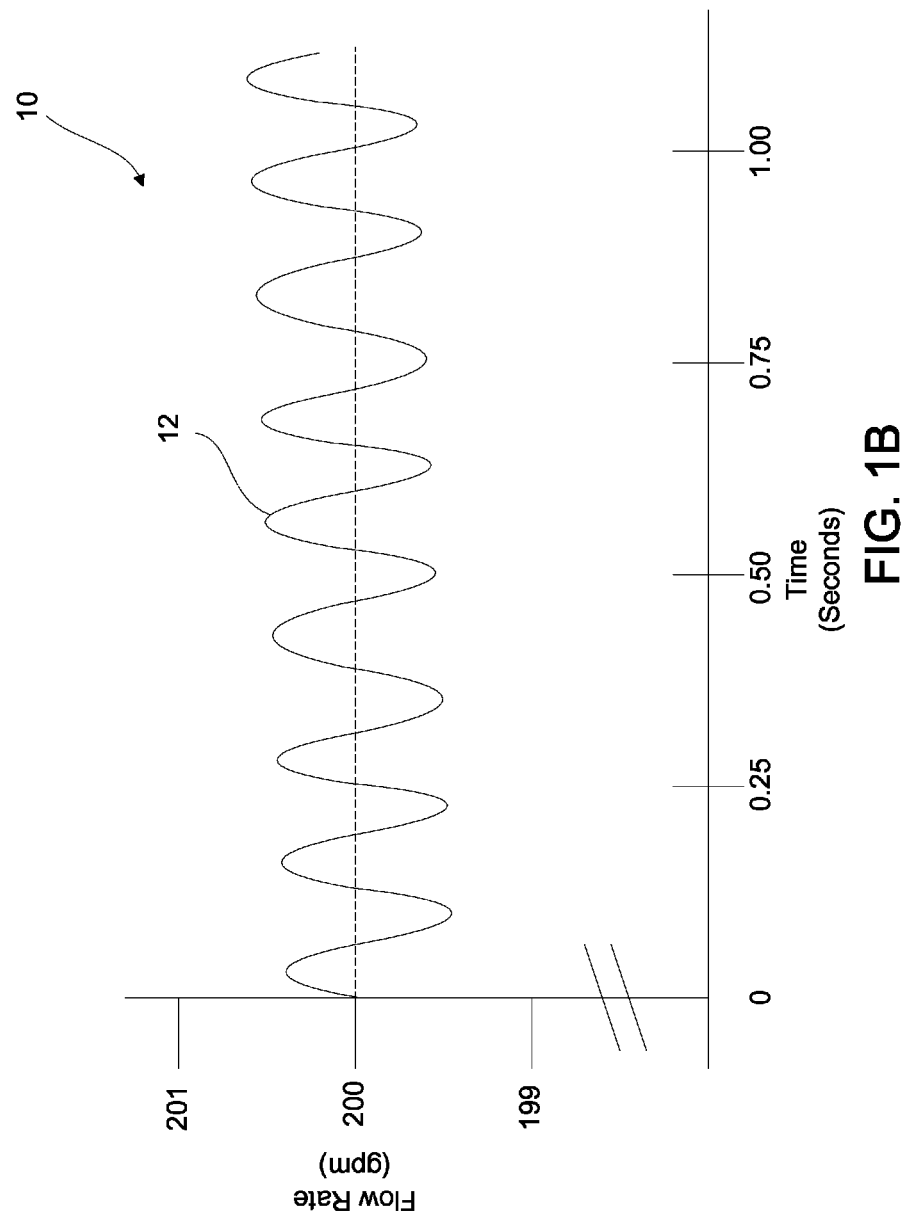

ELECTROMAGNETIC FLOW METER HAVING A DRIVER CIRCUIT INCLUDING A CURRENT TRANSDUCER

STATEMENT OF GOVERNMENT INTEREST

Subject matter of this disclosure was made with government support under NASA Contract No. NNM08AA55C. The government has certain rights in this subject matter.

RELATED APPLICATION DATA

This application is a non-provisional of U.S. Provisional Patent Application Ser. No. 61/787,559, filed Mar. 15, 2013, entitled "Electromagnetic Flow Meter," which application is incorporated by reference herein in its entirety.

FIELD OF THE INVENTION

The present invention generally relates to the field of fluid flow monitoring and control systems. In particular, the present invention is directed to an Electromagnetic Flow Meter for conductive fluids.

BACKGROUND

An electromagnetic flow meter (EMFM) measures the flow rate in a conductive fluid by inducing a magnetic field in the flow duct through which the fluid passes. The electrical potential induced in the fluid is a function of, and directly proportional to, the fluid velocity within the duct. While prior art EMFMs are generally capable of measuring steady-state or quasi-steady state flow rates of the fluid in the flow duct, they fail to accurately measure continuously varying velocities or flow rates. Continuously varying velocities may occur in certain flow systems, such as those used in dynamic transfer function (DTF) testing of components utilized in liquid fueled rocket propulsion systems. DTF testing is performed to characterize the dynamic response of such components in order to provide the building blocks of a fluid dynamic model of such a liquid fueled propulsion system.

Prior art EMFMs utilize pulsed direct current (DC) excitation or alternating current (AC) excitation methods to capture flows rates. The excitation is typically measured to provide normalization for the small variations in excitation voltage. The DC excitation method is limited by the pulse frequency, which limits the method to capturing quasi-steady state flow rates thereby rendering the method unsuitable for measuring continuously varying flow rates over wide bandwidths. The DC excitation method is also inherently limited by the natural charge of the conductive fluid and changes in the electrodes over time, commonly termed galvanic drift. In some situations, the electric potential induced by galvanic drift is significantly greater than the electric potential associated with the flow velocity of the fluid.

Attempts to overcome the deficiencies of the DC excitation method have resulted in the development of the AC excitation method. In the AC excitation method, the magnetic coils of the EMFM are excited with an alternating current typically powered by line (240V or 120V, 60 Hz or 50 Hz) sinusoidal voltage. The excitation is typically measured to provide normalization for the small variations in line voltage. The output signal is then measured on a mean level (root mean square or other) to provide a proportional output value to fluid flow rate. Prior efforts to capture fluctuating flow rates attempted to extend the response bandwidth of EMFM by increasing the AC excitation frequency to the point of satisfying the Nyquist criteria for the measurement of flow fluctuations. In order to adequately resolve the velocity variation of higher-frequency flow fluctuations, it was expected to require at least 10 to 25 samples throughout each flow velocity variation. However, this could require high AC frequencies that could result in high eddy current losses in the coil windings and cores. Moreover, in order to achieve adequate output signal amplitude at high measurement rates, high excitation voltages are required. These high losses on high excitation levels result in external heating of the EMFM, associated damage to the measurement device due to the heating, and associated heating of the contained fluid.

SUMMARY OF THE DISCLOSURE

In one implementation, the present disclosure is directed to an electromagnetic flow meter for measuring the flow rate of a conductive fluid in a conduit. The electromagnetic flow meter comprises an electromagnetic transducer designed and configured to produce a magnetic field that extends into the conductive fluid within the conduit so as to induce an electrical potential within the conductive fluid; a driver circuit designed and configured to drive said electromagnetic transducer with an electrical current so as to produce the magnetic field, said driver circuit including a current transducer, said current transducer designed and configured to produce a current signal representative of the electric current; at least two electrodes designed and configured to generate an electric potential signal representative of the electric potential of the conductive fluid; a signal conditioning unit in electrical communication with said at least two electrodes, said signal conditioning unit generating a conditioned signal from said electric potential signal; and a signal processing unit electronically coupled to said signal conditioning unit and said driver circuit, said signal processing unit determining designed and configured to determine a flow rate from said conditioned signal and said current signal.

In another implementation, the present disclosure is directed to an electromagnetic flow meter. The electromagnetic flow meter comprises a conduit for transporting a conductive fluid, at least two electrodes coupled to said conduit, said at least two electrodes designed and configured to generate an electric potential signal representative of an electric potential of the conductive fluid; a driver circuit designed and configured to induce a magnetic field within said conduit and including a current transducer, said current transducer designed and configured to produce a current signal representative of an electric current within said driver circuit; and a signal conditioning unit in electrical communication with said at least two electrodes, said signal conditioning unit including an AC coupled circuit and a direct coupled circuit, wherein each of said AC coupled circuit and direct coupled circuit is designed and configured to receive said electric potential signal, and wherein said AC coupled circuit is designed and configured to generate an AC conditioned signal and said direct coupled circuit generates a direct conditioned signal.

In yet another implementation, the present disclosure is directed a method of determining a flow rate of a conductive fluid. The method comprises periodically applying a magnetic field to the conductive fluid; measuring an electric potential of the fluid in the conduit when the magnetic field is applied and when it is not applied; conditioning the electric potential from said measuring; determining at least one flow rate component; and removing electric potential errors from the at least one flow rate component.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1B is a smaller-scale graph of the flow rate shown in FIG. 1A, showing a periodic variation over a nominal steady flow rate, representative of that used for input excitation for a dynamic transfer function measurement;

DETAILED DESCRIPTION

Figure 1A:
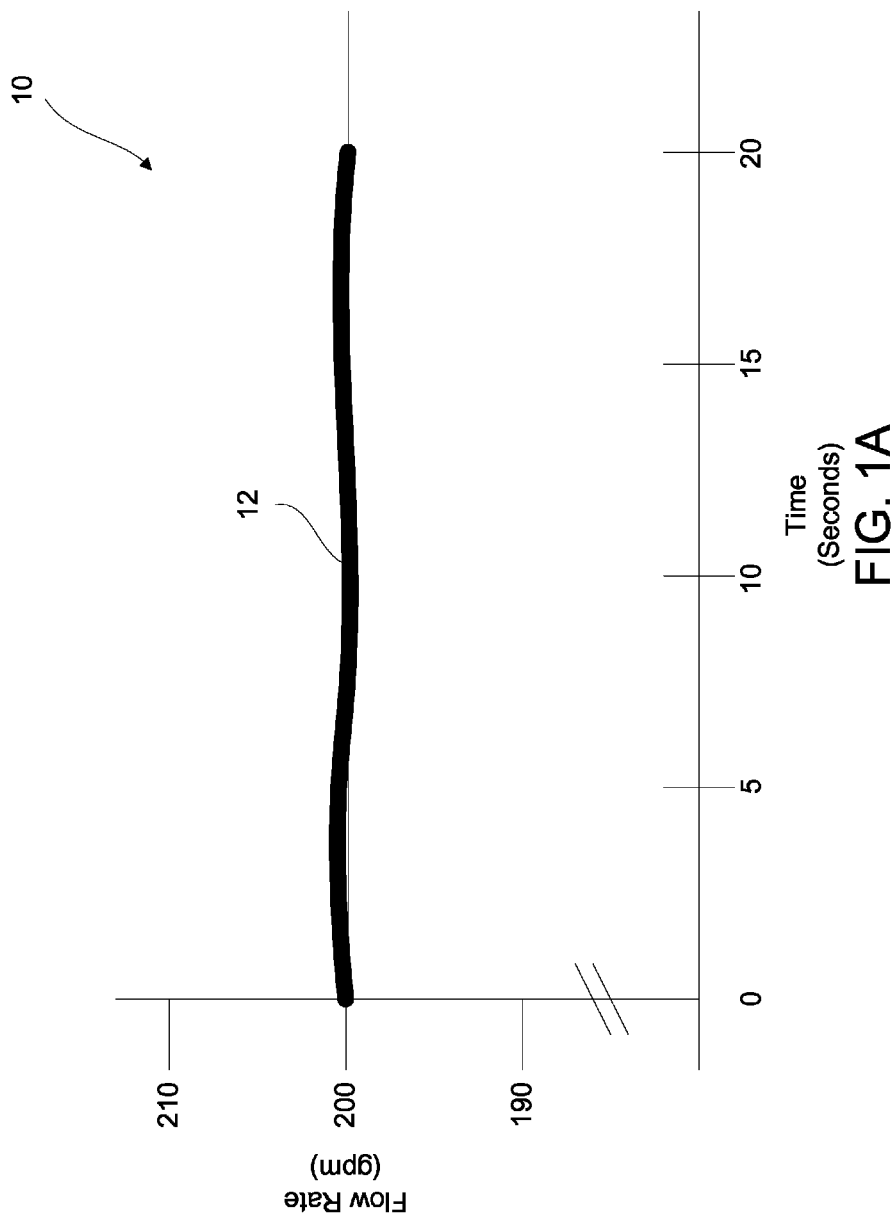
FIG. 1A is a graph of an exemplary flow rate over time for a conductive fluid, with a typical statistical variation.

Prior art electromagnetic flow meters (EMFMs) fail to capture subtle dynamic changes in flow rate and to correct for errors that lead to flow rate measurement inaccuracies over time, which results in ineffective management of the fluid flow. FIGS. 1A and 1B show an exemplary graph 10 of a flow rate 12 over time for a conductive fluid flowing through a pipe. As shown in FIG. 1A, flow rate 12 appears to be relatively constant over time, hovering at about 200 gallons per minute. When examined in greater detail, however, and as shown in FIG. 1B, flow rate 12 varies significantly over time, increasing and decreasing above and below 200 gallons per minute, as well as making a relatively constant shift upwards over the excerpted time-frame. The increases and decreases seen in flow rate 12 may be due to flow controls, e.g., pumps, valves, and associated controllers, that manipulate the fluid flow rate, while the relatively constant shift upwards is likely due to galvanic drift or other potential errors induced or inherent in the fluid measurement system.

To minimize flow rate variance and correct for flow rate measurement errors, an EMFM according to the present disclosure accurately measures both a complete flow rate and a dynamically-fluctuating component of the complete flow rate of a fluid within a flow duct by applying a unipolar DC voltage to excitation coils for a predetermined period of time, measuring the electric potential at a pair of electrodes, determining a complete flow rate and then determining a dynamic (or fluctuating) component of the complete flow rate during the "on" cycle of the DC excitation, and correcting the measurements for errors resulting from galvanic drift and other effects on the electric potential. Such an EMFM can also correct for effects from the excitation circuit induced during operation of the EMFM.

Figure 2:
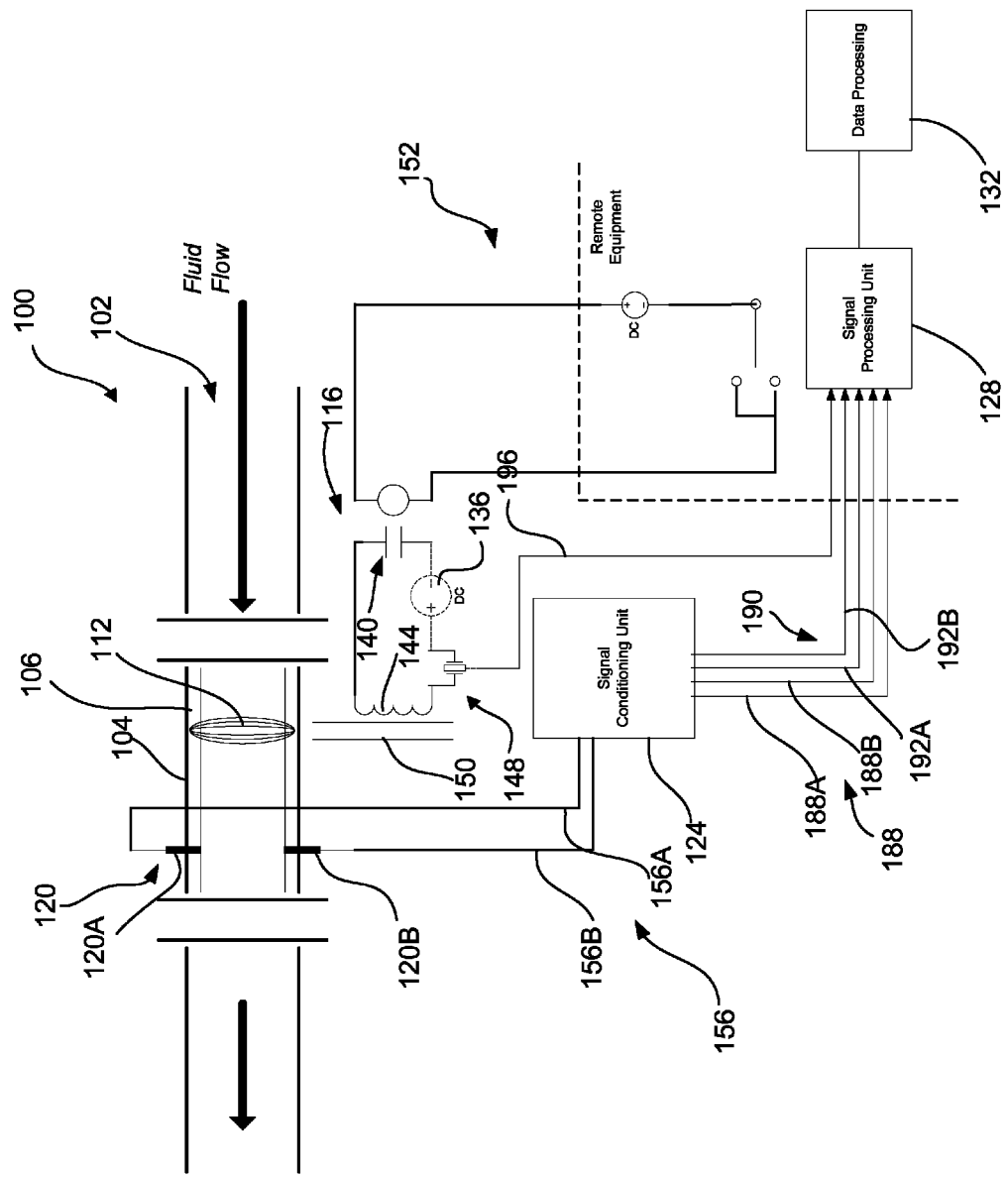
FIG. 2 is a block diagram of an exemplary electromagnetic flow meter according to an embodiment of the present invention.

Turning now to FIG. 2, there is shown an EMFM 100 according to an embodiment of the present invention. At a high level, EMFM 100 measures both a complete and a dynamic flow rate of a conductive fluid 102 flowing through a pipe 104 having a dielectric liner 106, the pipe being coupled to an electrical ground 108. The flow rate of fluid 102 is determined by the measured electric potential that results from applying a magnetic field 112 that extends within pipe 104. The magnetic field 112 is generated using driver circuitry 116 (described more fully below). The electric potential generated by magnetic field 112 is measured using electrodes 120A and 120B that are coupled to pipe 104 so as to be in contact with the conductive fluid. The measured electric potential from each of electrodes 120A and 120B are transmitted to a signal conditioning unit 124, which modifies the measured potential signals for transmission to a signal processing unit 128. Signal processing unit 128 is designed and configured to determine a complete and time-varying flow rate. Fluid velocity and flow rate may be inferred from the measured electric potential because the velocity of the conductive fluid is proportional to the electric potential generated by magnetic field 112. Thus, an instantaneous bulk fluid velocity of the fluid may be calculated based on the magnitude of the magnetic field and the measured electric potential. The complete flow rate calculated by signal processing unit 128 can also be used to determine a dynamic time-varying component of the complete flow rate, which represents a variation of the measured flow rate above a selected cutoff frequency during the "on" duty cycle of driver circuitry 116. The output of the signal processing unit 128 is sent to a data processing unit 132, which removes errors, such as, but not limited to, galvanic drift, from one or more of the flow rates, e.g., the dynamic time-varying flow rate or the complete flow rate.

In an exemplary embodiment of EMFM 100, driver circuitry 116 generates a unipolar-pulsed DC voltage so as to induce magnetic field 112 within pipe 104. In this embodiment, driver circuitry 116 alternates regularly between two voltage levels so as to periodically induce magnetic field 112. Typical excitation voltages might be in the range of 12 Volts to 42 Volts, but may be as little as 6 Volts or as much as 60 Volts. The resulting electrical potential in the fluid is then measured at the electrodes 120 after a pre-defined settling time, the settling time being the time for the voltage to reach a steady-state. The switching time or rate between switching voltages is limited by the required settling time for the measurement of each flow-rate sample. In the example shown, driver circuitry 116 includes a DC voltage source 136, a switch 140, an excitation coil 144, and a current transducer 148. DC voltage source 136 is used to supply a voltage potential and is electrically coupled to switch 140 and current transducer 148. Switch 140 periodically receives a signal from a remotely controlled signal provider (indicated generally at 152) so as to complete the circuit that allows current to travel to excitation coil 144 from DC voltage source 136. Current transducer 148 measures the current traveling through the circuit and produces a signal that is received by signal processing unit 128. When energized, excitation coil 144 generates a magnetic field, and being proximate to a magnet core 150, causes the magnet core to project magnetic field 112.

Figure 3:
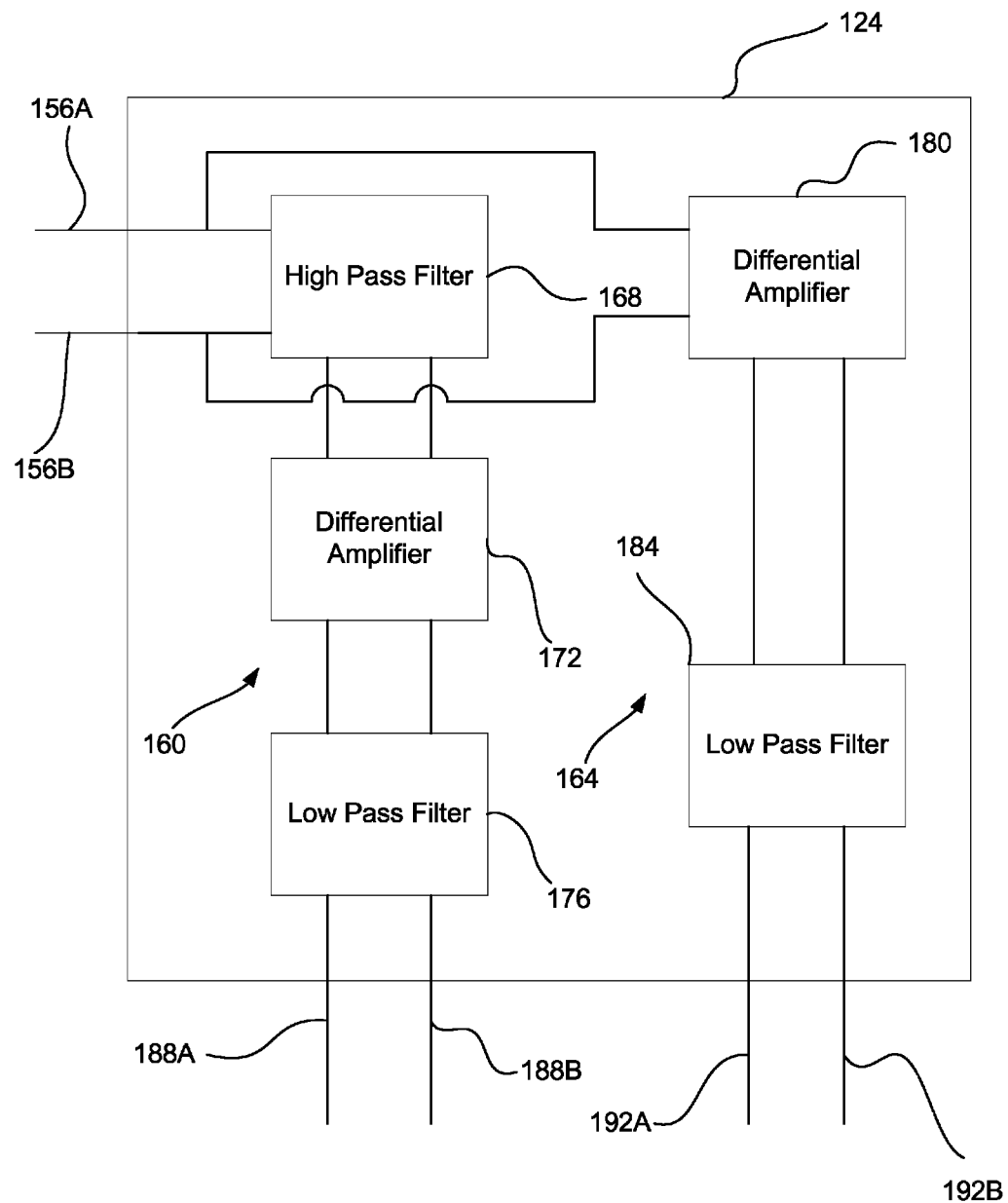
FIG. 3 is a block diagram of an exemplary signal conditioning unit according to an embodiment of the present invention.

With reference now to FIGS. 2 and 3, signal conditioning unit 124 receives a pair of measured electric potential signals 156A and 156B (one from each of electrodes 120A and 120B, respectively) as inputs. Each of measured electric potential signal 156A and 156B is received at an AC coupled circuit 160 and a direct coupled circuit 164, both of which serve to condition the measured electric potential signal for further analysis by signal processing unit 128. AC coupled circuit 160 includes a high pass filter 168, a differential amplifier 172, and a low pass filter 176. High pass filter 168 passes high-frequency signals and attenuates signals with frequencies lower than a predetermined cutoff frequency. Differential amplifier 172 increases the amplitude of the high-frequency signals received from high pass filter 168. As described in more detail below, the amplification of the high-frequency signals allows for the dynamic analysis of the variance of the flow rate of the conductive fluid in pipe 104 over time. Low pass filter 176 receives amplified high-frequency signals from differential amplifier 172, and removes noise and undesirable fluctuations from the high-frequency signal by passing low-frequency signals and attenuating signals with frequencies higher than the a predetermined frequency. In alternative embodiments, AC coupled circuit 160 does not include low pass filter 176.

As mentioned above, direct coupled circuit 164 also receives the measured electric potential signals 156A and 156B from electrodes 120A and 120B, respectively. Direct coupled circuit 164 includes a differential amplifier 180 and a low pass filter 184, both of which serve similar purposes as differential amplifier 172 and low pass filter 176 described above, however, the devices may be configured differently.

Returning to FIG. 2, a pair of conditioned signals are output from each of AC coupled circuit 160 and direct coupled circuit 164, e.g., conditioned signals 188A, 188B and 192A, 192B, respectively. Conditioned signals 188A, 188B and 192A, 192B, along with a current signal 196 from current transducer 148 are received by signal processing unit 128. In an exemplary embodiment, signal processing unit 128 is a high frequency data acquisition system that provides synchronized, precision clock timed analysis of the incoming conditioned signals 188A, 188B, 192A, and 192B. Signal processing unit 128 determines a complete flow rate (described in more detail with reference to FIG. 4) from conditioned signals 192A, 192B and a dynamic flow rate (described in more detail with reference to FIG. 5) from conditioned signals 188A, 188B.

Signal processing unit 128 also evaluates the electric potential drift affecting the measurements of EMFM 100. Based on current signal 196, signal processing unit 128 determines when the DC excitation from driver circuitry 116 is in an "off" mode (also seen in FIG. 8), i.e., between "on" periods that would excite excitation coils 144. Although there is no DC excitation during the off mode, conditioned signals 188A, 188B, 192A, and 192B are still generated and transmitted to signal processing unit 128, which allows the signal processing unit to evaluate the electric potential differences between each respective conditioned signal at consecutive DC excitation off modes. The electric potential differences represent the drift that occurred during the time the DC excitation was on.

The complete and dynamic flow rates (or representational values of the flow rates) are sent to data processing unit 132, which removes the drift determined by signal processing unit 128 (discussed further below with reference to FIGS. 6-8). Data processing unit 132 may, via a user interface (not shown), present this information to a user for evaluation, and/or the information may be provided to other parts of a flow control system (not shown), e.g., pump or valve controllers, for modification of the flow rate in pipe 104.

Figure 4:
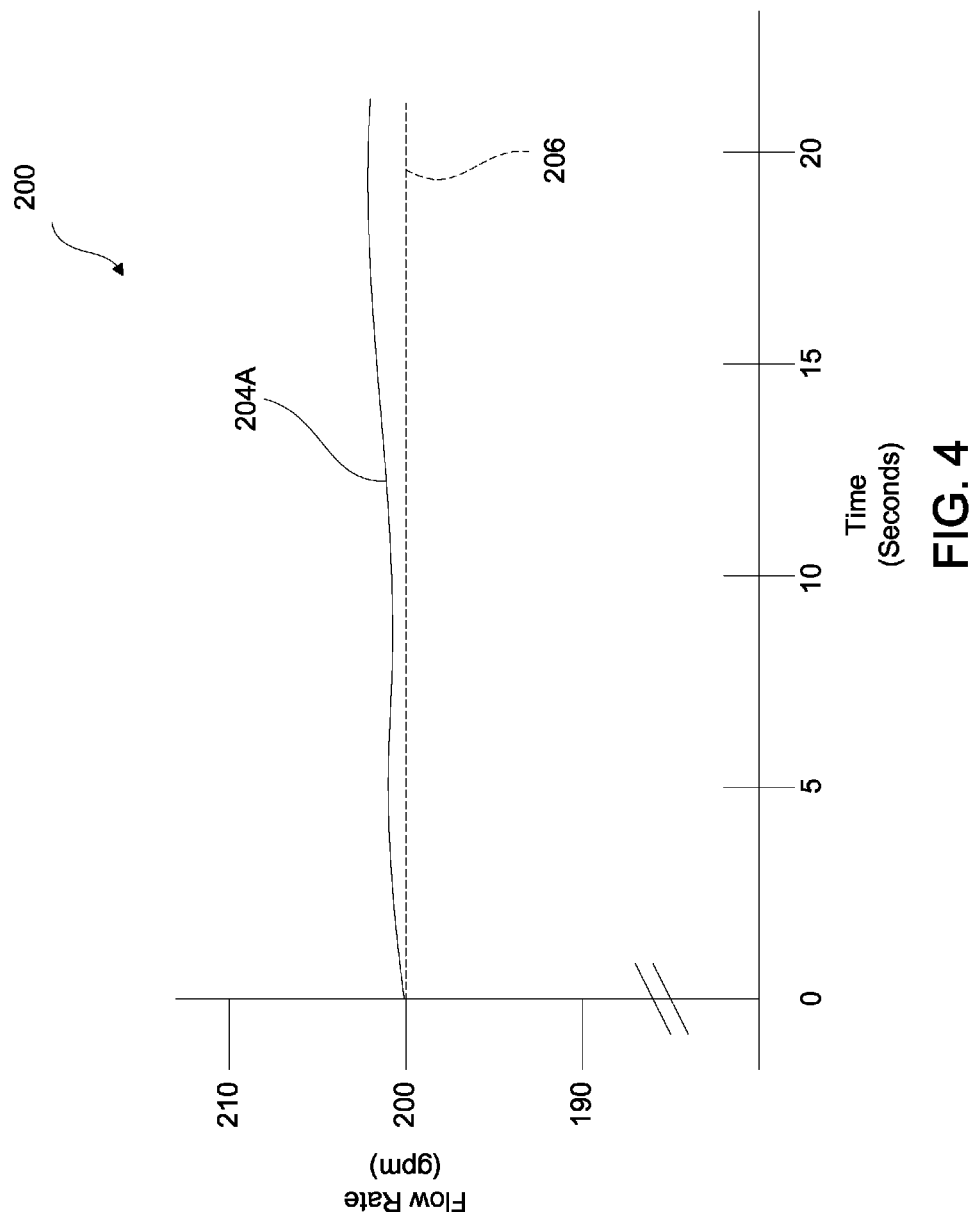
FIG. 4 is a graph of flow rate over time according to an embodiment of the present invention.
Figure 5A:
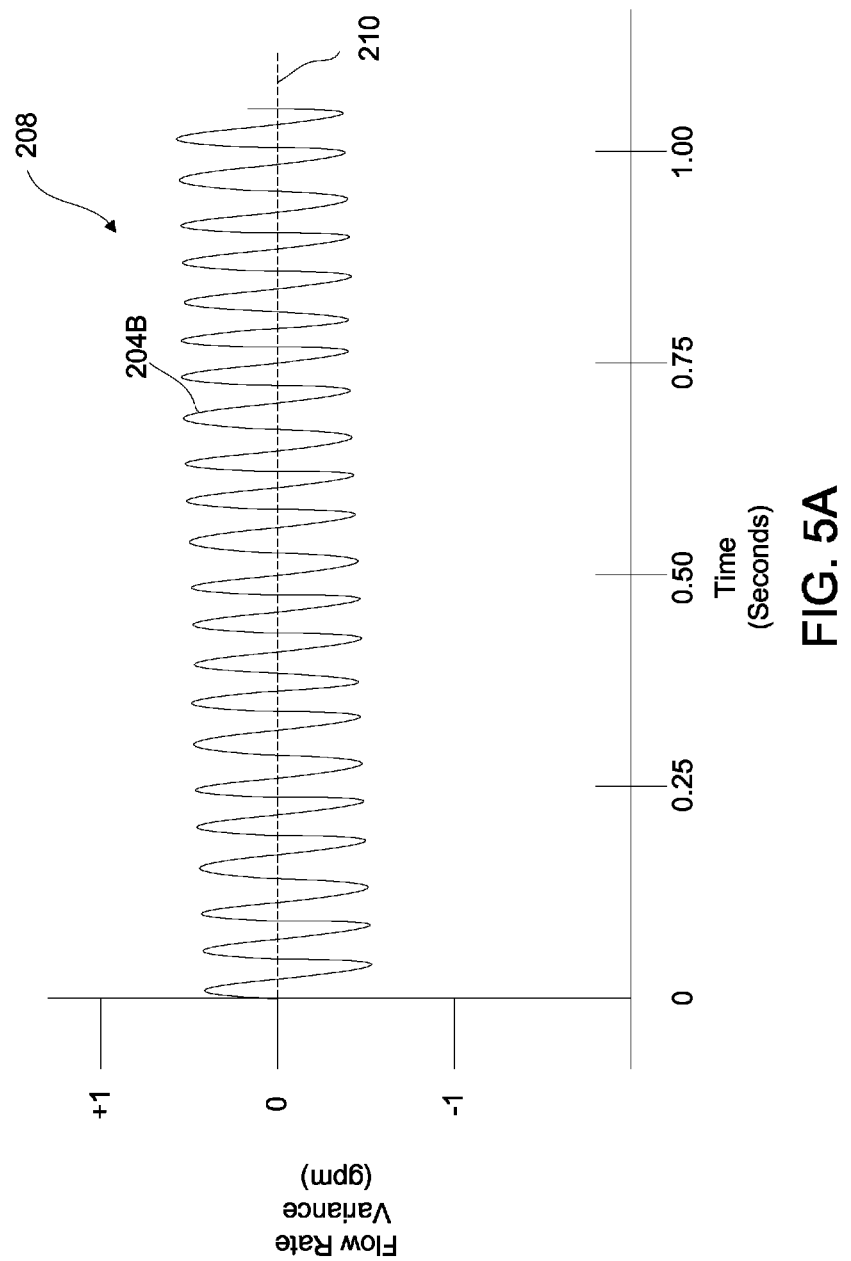
FIG. 5A is a graph showing the flow rate variance over time according to an embodiment of the present invention.
Figure 5B:
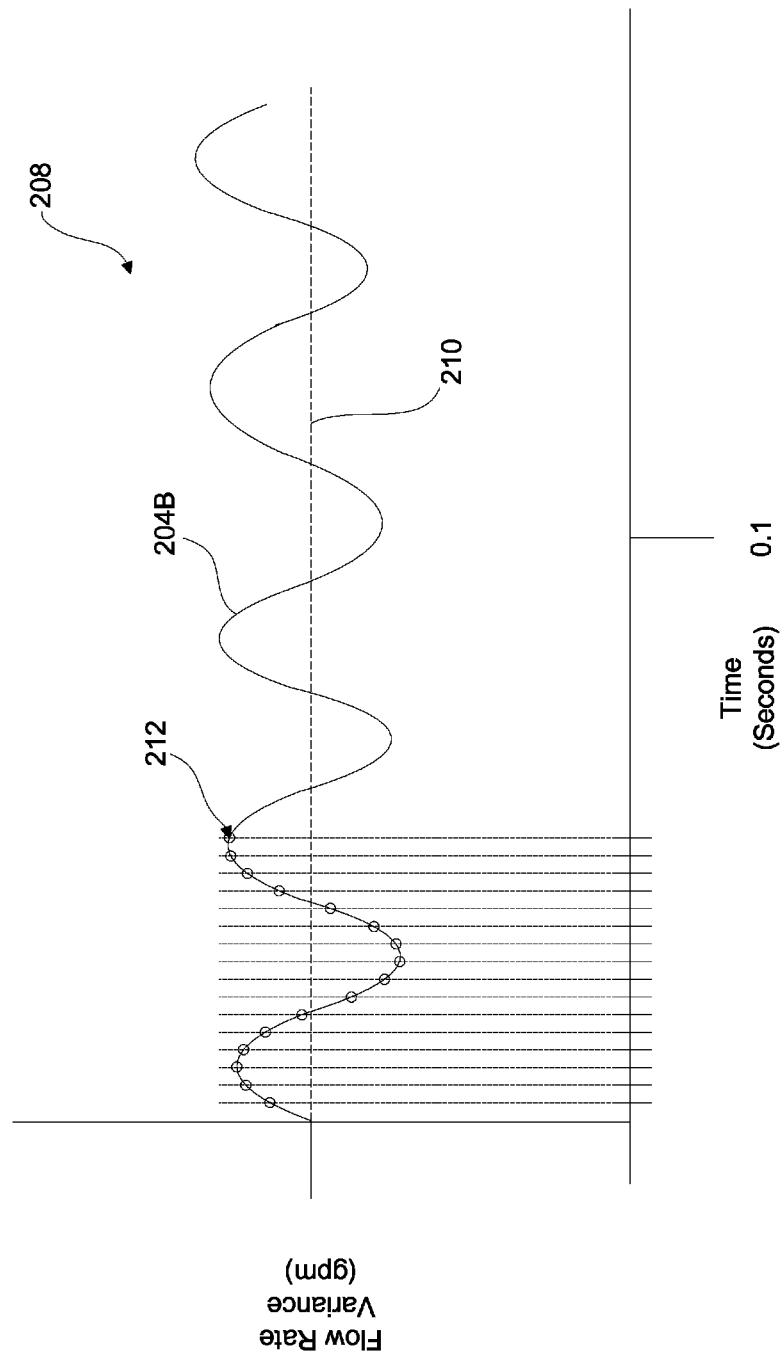
FIG. 5B is a graph showing a blown-up portion of FIG. 5A.
Figure 6:
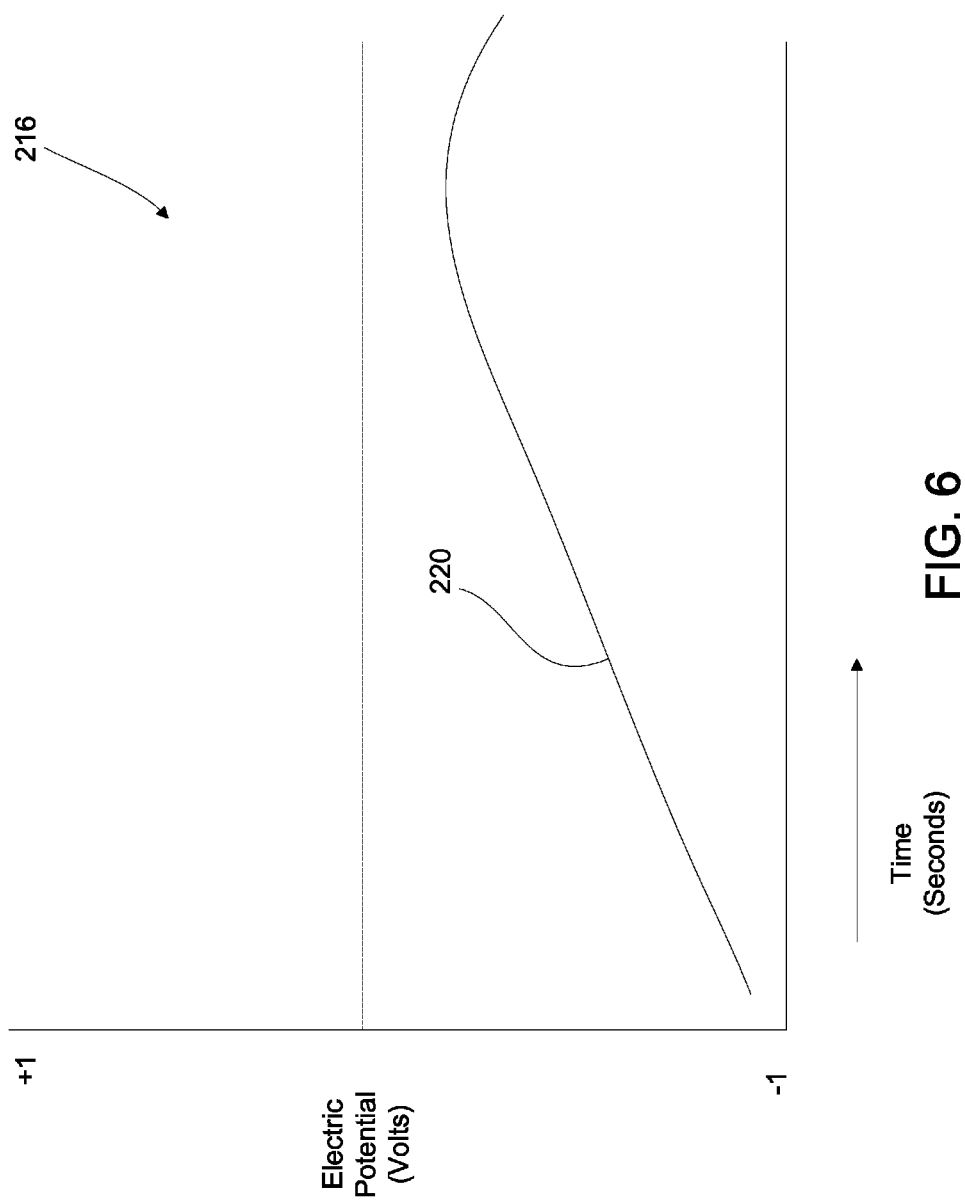
FIG. 6 is a graph representing flow rate frequency drift over time according to an embodiment of the present invention.

FIGS. 4-6 are graphs showing the flow rate (FIG. 4), flow rate variance (FIGS. 5A and 5B), and changes in electric potential (FIG. 6), of the fluid flowing in pipe 104 over time as measured by an EMFM made in accordance with the present invention, such as EMFM 100 of FIG. 2. The flow rate shown in FIG. 4 and flow rate variance shown in FIGS. 5A and 5B are determined from the electric potentials sensed by the electrodes 120A and 120B of EMFM 100. FIG. 4 is an exemplary graph 200 of flow rate over time for the complete flow rate component as produced by direct coupled circuit 164. In the exemplary fluid flow shown in FIGS. 4-5B, complete flow rate component 204A is has a pseudo-steady flow rate of about 200 gallons per minute, but drifts away from 200 gallons per minute (as exemplified by the reference line 206) over time due to low frequency drift effects, such as galvanic drift (discussed further in connection with FIG. 6). The drift in FIG. 4 is shown in the positive direction, but it may drift negatively and may be larger or smaller than the drift shown in FIG. 4 (or FIG. 6 below).

FIGS. 5A and 5B each show a graph 208 of flow rate over time for the time-varying flow rate component as produced by the AC coupled circuit 160. In FIGS. 5A and 5B, the vertical axis is the deviation from complete flow rate 204A shown in FIG. 4. As shown, time-varying flow rate component 204B resembles a non-uniform wave function with fluctuations both above and below a nominal flow rate, 0, shown by dotted line 210. FIG. 5B is a blown-up view of a portion of the time-varying flow rate 204B shown in FIG. 5A. FIG. 5B also includes measurement points 212 that are taken at discrete, uniform, time intervals. In an exemplary embodiment, measurement points 212 are collected every $1/1024$ of a second by signal processing unit 128. In alternative flow rate applications where, for example, the complete flow rate has a low frequency time-varying component, as well as one or more higher-frequency components, low pass filters 176 and/or 164 may be modified with different cutoff frequencies as needed to capture one or more components of the fluid flow.

FIG. 6 is a graph 216 that shows low frequency drift 220 that occurs over time. Low frequency drift 220 can be the result of the conductivity changes in the conductive fluid, changes in electrodes 120A-B (FIG. 2), and/or other effects. As shown in FIG. 6, there is a change in the measured potential at the electrodes that, when measured, results in an inaccurate flow rate measurement. Drift 220 can be fairly dramatic and in some instances may eclipse the value of the actual electric potential of the conductive fluid when under the influence of magnetic field 112 (FIG. 2). A method of removing the effect of drift 220 is discussed further below with reference to FIGS. 7 and 8.

Figure 7:
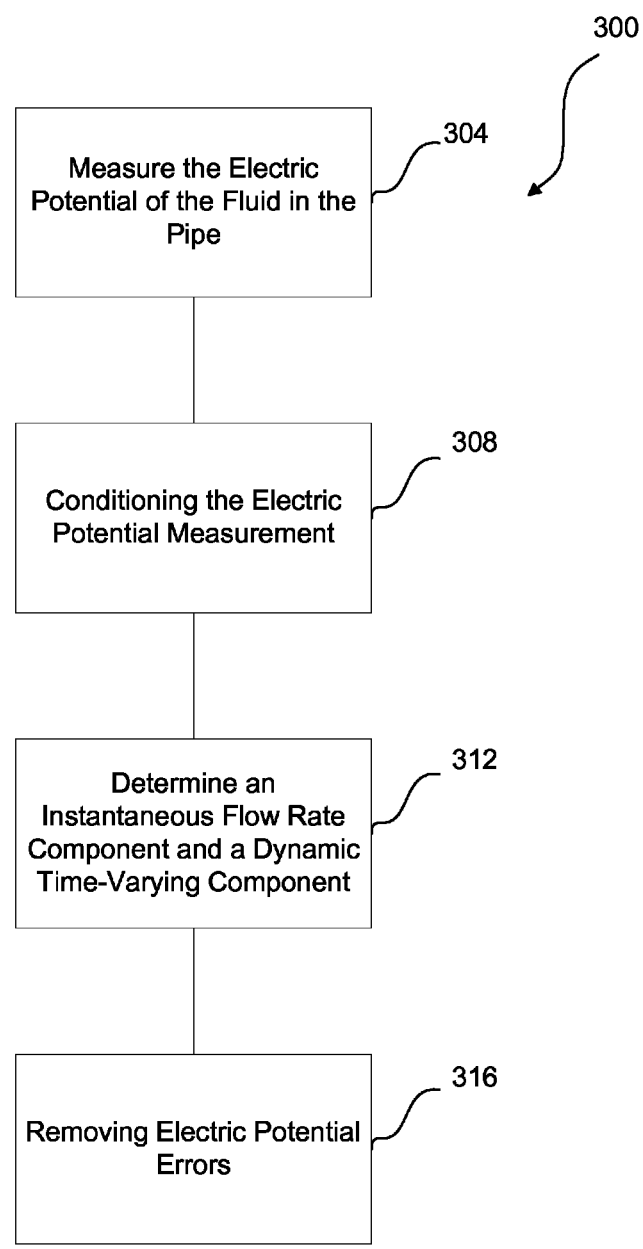
FIG. 7 is a block diagram of a method of determining a flow rate according to an embodiment of the present invention.
Figure 8:
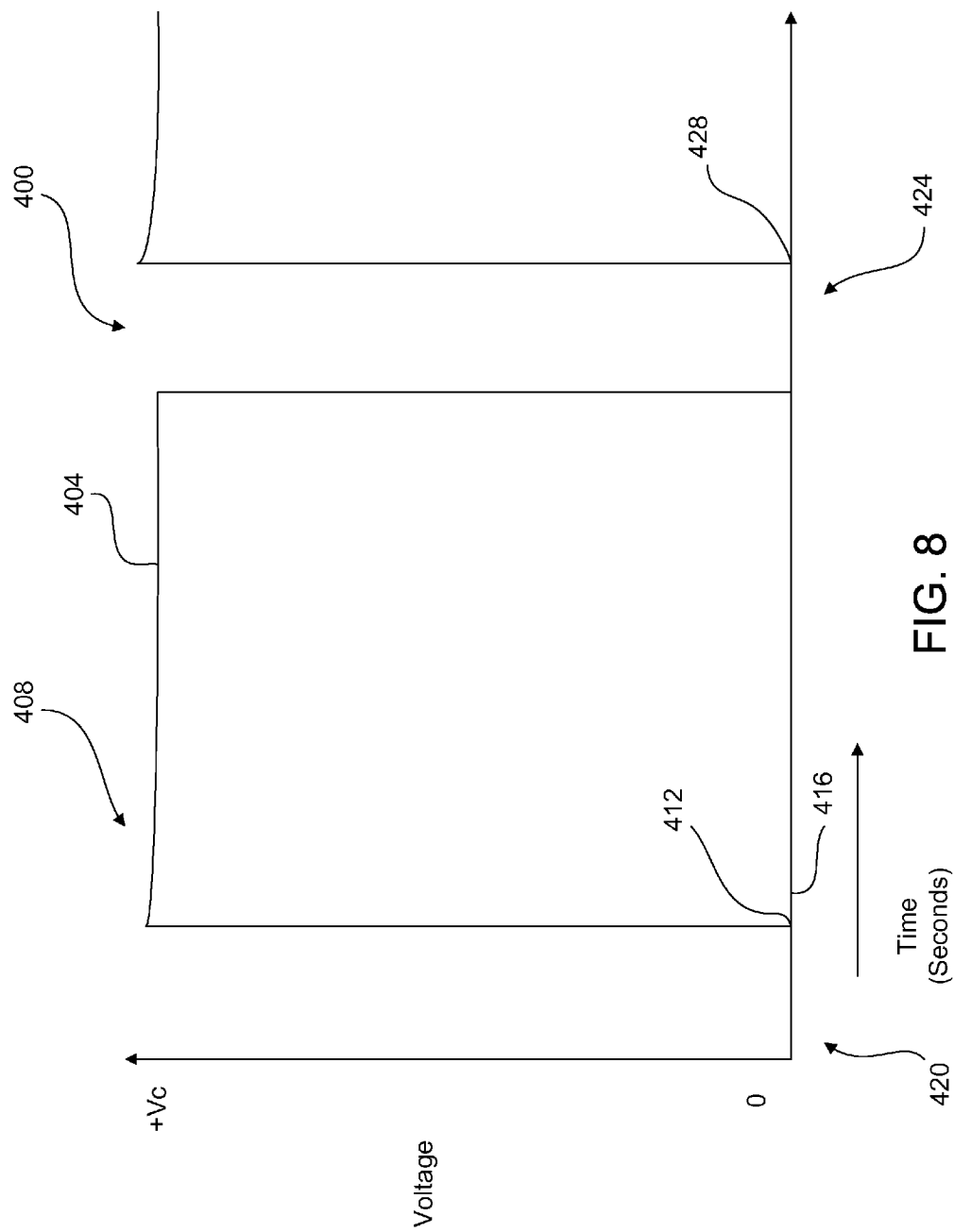
FIG. 8 is a graph of DC applied voltage over time according to an embodiment of the present invention.

Turning now to FIG. 7, there is shown a method 300 of determining the fluid flow rate of a conductive fluid in a pipe. At step 304, the electric potential of the fluid is measured. As described above, the electric potential of the fluid may be measured by producing a magnetic field such that the conductive fluid is affected by the field and measuring the electric potential at electrodes spaced apart within the pipe. In an exemplary embodiment, step 304 is facilitated by using a unipolar-pulse DC voltage to excite excitation coils.

At step 308, the measurements of the electric potential representing the rate of fluid flow within the pipe are conditioned to provide a complete flow measurement of the fluid flow rate as well as a dynamic time-varying measurement of the fluid flow rate. In an exemplary embodiment, electric potential data measured at the electrodes is conditioned using both an AC coupled circuit and a direct coupled circuit. The AC coupled circuit conditions the data for suitable determination of the dynamic time-varying flow rate of the fluid, while the direct coupled circuit conditions the data for determination of the complete flow rate.

At step 312 a complete flow rate and dynamic time-varying flow rate are determined. The complete flow rate is determined through an analysis of the data received from, for example, the direct coupled circuit. In an exemplary embodiment, a processing unit, such as signal processing unit 128, uses the conditioned electric potential values received after the DC excitation has settled. An example settling time for a DC excitation is shown in FIG. 8, which is a graph 400 displaying the change in voltage over time and includes a DC excitation 'on' period 404 generated by driver circuitry, such as driver circuitry 116. Settling time 408 is the period shortly after excitation initiation time 412. The duration of settling time 408 will vary based on the design of the driver circuitry and the magnitude of the DC excitation, among other things. After the end of settling time 408, shown as settling end 416, the signal processing unit receives conditioned electric potential measurements throughout the period that DC excitation 404 is applied and uses these conditioned electric potential measurements to determine the complete flow rate at each measurement time.

The dynamic time-varying flow rate can be determined through an analysis of the electric potential data received from the AC coupled circuit. In an exemplary embodiment, the dynamic time-varying flow rate is determined using a high frequency data acquisition system that provides synchronized, precision clock timed analysis of the data. Thus, at repetitive, equally spaced, time intervals the flow rate value is determined. In an exemplary embodiment, the time intervals are $1/1024$ of a second.

At step 316, errors, such as galvanic shift and other electric potential effects, in the measured flow rates are removed. The removal process may include evaluating the electric potential before and after the initiation of the DC excitation. For example, and with reference to FIG. 8, an initial off period 420 preceded excitation initiation 412, and a terminating off period 424 starts at the end of DC excitation 404 and ends prior to a second excitation initiation 428. During the first off period 420 and the second off period 424 the electric potentials are measured and the mean value of the two periods determined. Said mean value is then differenced from the corresponding flow rates measured during DC excitation 404 so as to correct for the errors.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electromagnetic flow meter for measuring the flow rate of a conductive fluid in a conduit, the electromagnetic flow meter comprising:
   an electromagnetic transducer designed and configured to produce a magnetic field that extends into the conductive fluid within the conduit so as to induce an electrical potential within the conductive fluid;
   a driver circuit designed and configured to drive said electromagnetic transducer with an electrical current so as to produce the magnetic field, said driver circuit including a current transducer, said current transducer designed and configured to produce a current signal representative of the electric current;
   at least two electrodes designed and configured to transmit an electric potential signal representative of the electric potential of the conductive fluid;
   a signal conditioning unit in electrical communication with said at least two electrodes, said signal conditioning unit generating a conditioned signal from said electric potential signal; and
   a signal processing unit electronically coupled to said signal conditioning unit and said driver circuit, said signal processing unit designed and configured to determine a flow rate from said conditioned signal and said current signal.

2. An electromagnetic flow meter according to claim 1, wherein said signal conditioning unit includes an AC coupled circuit and a direct coupled circuit.

3. An electromagnetic flow meter according to claim 2, wherein each of said AC coupled circuit and direct coupled circuit are designed and configured to receive said electric potential signal, and wherein said AC coupled circuit is designed and configured to generate an AC conditioned signal and said direct coupled circuit is designed and configured to generate a direct conditioned signal.

4. An electromagnetic flow meter according to claim 1, wherein said driver circuit is designed and configured to generate a magnetic field that extends within the conduit.

5. An electromagnetic flow meter according to claim 4, wherein said driver circuit is designed and configured to generate said magnetic field with a unipolar DC voltage.

6. An electromagnetic flow meter according to claim 4, wherein said driver circuit is designed and configured to provide a DC voltage at periodic intervals separated by an off period and wherein said signal processing unit is designed and configured to determine a difference between consecutive ones of said off periods.

7. An electromagnetic flow meter according to claim 6, wherein said signal processing unit is designed and configured to modify said flow rate by said difference.

8. An electromagnetic flow meter comprising:
   a conduit for transporting a conductive fluid,
   at least two electrodes coupled to said conduit, said at least two electrodes designed and configured to transmit an electric potential signal representative of an electric potential of the conductive fluid;
   a driver circuit designed and configured to induce a magnetic field within said conduit and including a current transducer, said current transducer designed and configured to produce a current signal representative of an electric current within said driver circuit; and
   a signal conditioning unit in electrical communication with said at least two electrodes, said signal conditioning unit including an AC coupled circuit and a direct coupled circuit, wherein each of said AC coupled circuit and direct coupled circuit is designed and configured to receive said electric potential signal, and wherein said AC coupled circuit is designed and configured to generate an AC conditioned signal and said direct coupled circuit generates a direct conditioned signal.

9. An electromagnetic flow meter according to claim 8, further comprising a signal processing unit electronically coupled to said signal conditioning unit and said driver circuit, said signal processing unit being designed and configured to determine a first flow rate from said AC conditioned signal.

10. An electromagnetic flow meter according to claim 9, wherein said signal processing unit is designed and configured to determine a second flow rate from said direct conditioned signal.

11. An electromagnetic flow meter according to claim 8, further comprising a signal processing unit electronically coupled to said signal conditioning unit and said driver circuit, said signal processing unit being designed and configured to determine a first flow rate from said direct conditioned signal.

12. An electromagnetic flow meter according to claim 11, wherein said driver circuit is designed and configured to generate said magnetic field with a unipolar DC voltage.

13. An electromagnetic flow meter according claim 12, wherein said driver circuit is designed and configured to provide a DC voltage at periodic intervals separated by an off period and wherein said signal processing unit is designed and configured to determine a difference between consecutive ones of said off periods.

14. An electromagnetic flow meter according to claim 13, wherein said signal processing unit modifies said first flow rate by said difference.

15. A method of determining a flow rate of a conductive fluid, the method comprising:
 periodically applying a magnetic field to the conductive fluid;
 measuring an electric potential of the fluid in the conduit when the magnetic field is applied and when it is not applied;
 conditioning the electric potential from said measuring;
 determining at least one flow rate component; and
 removing electric potential errors from the at least one flow rate component.

16. A method according to claim 15, wherein the at least one flow rate component comprises a complete flow rate component.

17. A method according to claim 16, wherein the at least one component further comprises a dynamic time-varying component.

18. A method according to claim 15, wherein said removing includes the steps of:
 determining a first electric potential of the conductive fluid when the magnetic field is applied; and
 comparing the first electric potential to a second electrical potential, wherein the second electric potential is an electric potential of the conductive fluid at a sequential time when the magnetic field is not applied.

19. A method according to claim 15, wherein said conditioning includes inputting the electric potential into an AC coupled circuit and a direct coupled circuit.

20. A method according to claim 19, wherein the at least one flow rate component is a complete flow rate component and a dynamic time-varying component, wherein the output of the AC coupled circuit is a first conditioned signal representative of the dynamic time-varying component and output of the direct coupled circuit is a second conditioned signal representative of the complete flow rate.

* * * * *